United States Patent [19]
Leventer

[11] 3,939,487
[45] Feb. 17, 1976

[54] COLOR VIDEO SIGNAL GENERATORS

[76] Inventor: William Leventer, 18 Bruce Lane, East Northport, N.Y. 11731

[22] Filed: Oct. 5, 1973

[21] Appl. No.: 403,868

[52] U.S. Cl. .................................. 358/81; 358/75
[51] Int. Cl.² ...................... H04N 1/46; H04N 9/02
[58] Field of Search... 178/5.4 HE, 5.4 CD, 5.4 AC, 178/5.4 R, 5.2 R, DIG. 22; 340/324 A, 324 D; 358/81, 82, 22, 11, 12

[56] References Cited
UNITED STATES PATENTS

| | | | |
|---|---|---|---|
| 2,874,212 | 2/1959 | Bechley | 178/5.4 |
| 3,668,686 | 6/1972 | Strohmeyer | 340/324 |
| 3,749,823 | 7/1973 | Warner | 178/5.4 |
| 3,761,607 | 9/1973 | Hanseman | 178/5.4 |
| 3,771,155 | 11/1973 | Yasuda | 340/324 |

Primary Examiner—Robert L. Griffin
Assistant Examiner—R. John Godfrey

[57] ABSTRACT

A circuit arrangement for developing composite video signals used in color TV transmission using digital techniques. A plurality of N color select channels are gated by appropriate digital-type control signals. Each of the channels includes means for establishing the chroma amplitude and phase of the signal associated with a particular color. The phase and amplitude of each of the channels, which represents chrominance information, is developed by time shifting, gating, and phase shifting the basic 3,579,545 hz square wave. The chrominance information of each channel is combined at an appropriate LC filter. Luminance amplitude information is separately developed for each channel. Chrominance information, luminance information, and other video information (composite sync, combined video) are resistively added at a common node summing point. Other gating signals are also utilized so that the summed signal represents full chroma transmission information, such as is necessary for a standard TV signal.

2 Claims, 2 Drawing Figures

3,939,487

COLOR VIDEO SIGNAL GENERATORS

BACKGROUND OF THE INVENTION

The present invention relates to color TV transmissions and more particularly, to a circuit arrangement for developing all of the chroma video signals, which are necessary for TV transmission, particularly when displaying alphanumeric information using primarily digital techniques.

When one or more sources of alphanumeric information are displayed on the same picture, it is desired that a different color be used to identify each information area of the picture. In prior art transmission techniques, this encoding of color background levels for alphanumeric display utilized complex analog circuitry to create the appropriate "I" and "Q" signals. As with most analog circuitry, prior art arrangements had problems of size, drift, and reliability associated therewith.

SUMMARY OF THE INVENTION

In accordance with the teachings of the present invention, all of the appropriate signals necessary for alphanumeric encoding can be generated by the use of circuits employing digital techniques. This arrangement allows for a substantial simplification in the circuitry as well as avoiding the usual limitations of analog approaches. In addition, an important consideration is that the entire circuit may readily be reduced to integrated circuit form with its attendant enormous reduction in size.

It is, therefore, an object of the present invention to provide a novel arrangement for the generation of color video signals for TV transmission using primarily digital techniques.

It is a further object of the present invention to provide an arrangement for the generation of color video signals for TV transmission which is readily converted to integrated circuit form.

It is another object of the present invention to provide an arrangement for the generation of color video signals for TV transmission which avoids the complexity, cost, and unreliability of prior analog arrangements.

It is still another object of the present invention to provide an arrangement for the generation of color signals which provides complete flexibility in the TV transmission of quantities of alphanumeric information which are required to be displayed.

In accordance with the present invention, therefore, color video signal generating apparatus for providing video signals for TV transmission pruposes comprises means for providing a master siganl of predetermined frequency. Also included are a plurality of means responsive to the master signal, each for providing a chrominance signal having a predetermined amplitude and phase associated with a different predetermined color and a plurality of gating means, each corresponding to a different one of the chrominance signal means and responsive to predetermined command signals for selectively activating predetermined ones of the chrominance signal means. The gating means also includes means for providing a luminance signal having a preselected amplitude associated with a different predetermined color.

For a better understanding of the present invention, together with other and further objects thereof, reference is made to the following description and drawing while the scope of the invention is pointed out in the appended claims.

BRIEF DESCRIPTION OF THE DRAWINGS

Referring to the Drawings.

DESCRIPTION AND OPERATION OF THE INVENTION

Figure 1:
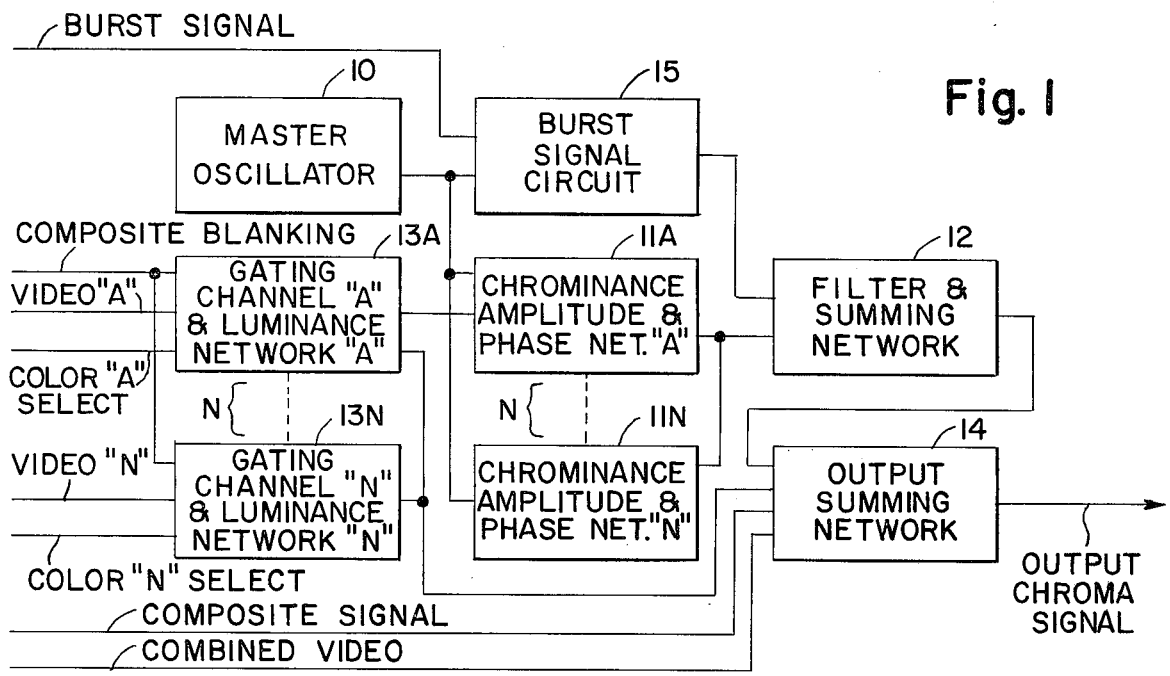
FIG. 1 is overall block diagram of the present invention.

Referring initially to FIG. 1, the basic components of the present invention are disclosed. Means for providing a master signal of a predetermined frequency is shown as master oscillator 10. Oscillator 10 provides a color subcarrier at a frequency of 3,579,545 hertz.

The output of the oscillator 10 is coupled to a plurality of means each for providing a chrominance signal having a predetermined amplitude and phase associated with a different predetermined color-shown in FIG. 1 as chrominance amplitude and phase networks 11A–11N. A plurality of gating means each corresponding to a different one of the chrominance signal means and responsive to predetermined command signals for selectively activating predetermined ones of the chrominance signal means are indicated as gating channel and luminance networks 13A–13N. These elements 13A–13N also include means for providing a luminance signal having a preselected amplitude associated with a different predetermined color.

The chrominance output signals of networks 11A–11N are combined at filter and summing network 12 and then are supplied to output summing network 14. A burst signal circuit 15, upon receipt of an appropriate command signal and responsive to the oscillator 10 also couples a signal to filter and summing network 12 which is combined with the chrominance network signals. The filter portion of component 12 operates to extract the 3,579,545 hertz fundamental of the combined signal.

The outputs of the luminance networks 13A–13N are combined and also summed at output summing network 14. A composite sync signal and combined video signal are also combined at output summing network 14.

Figure 2:
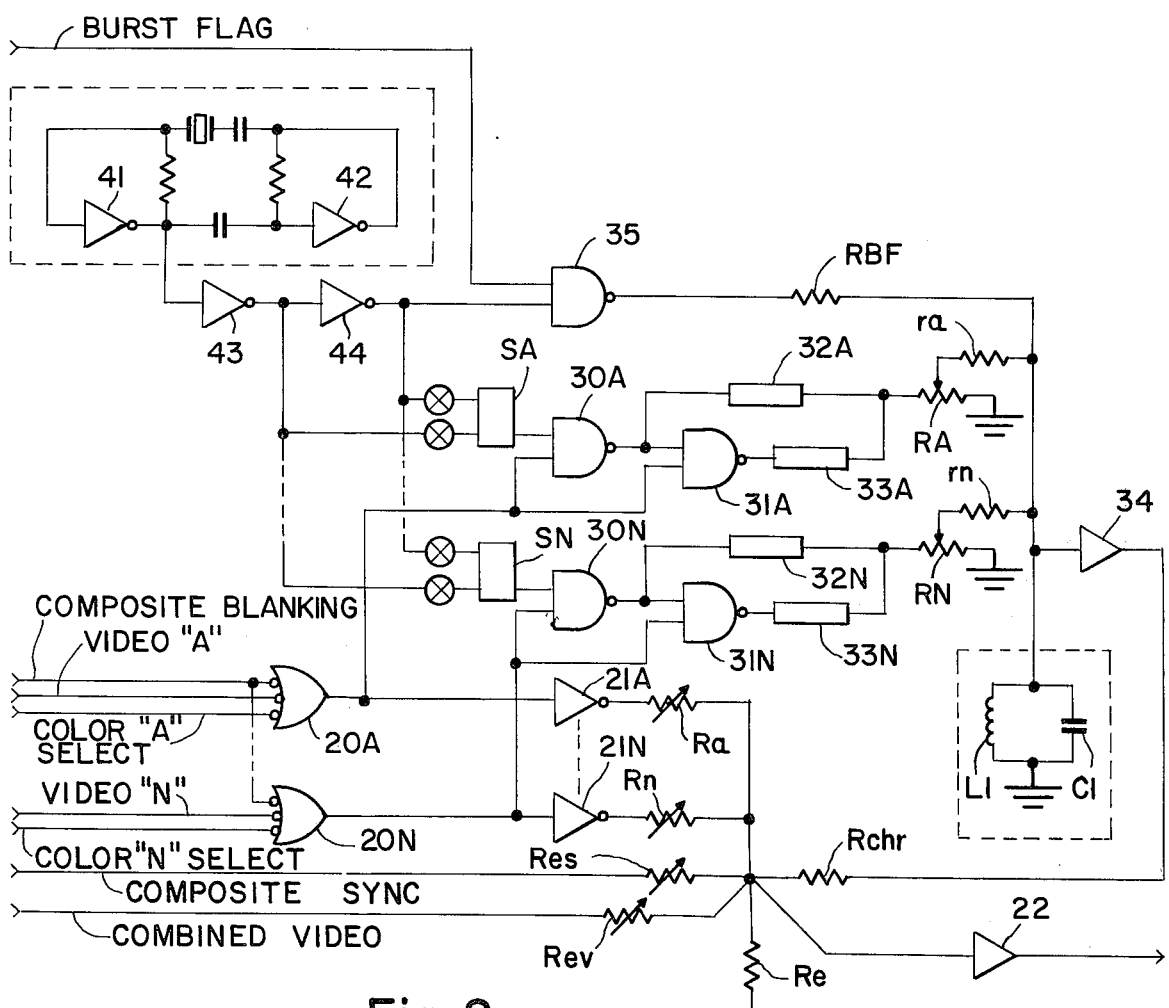
FIG. 2 represents a detailed schematic representation of the principal embodiment of the present invention.

Now referring to FIG. 2, a more complete explanation of the present invention will be presented. The basic command signals for determining which colors and picture areas will be selected for display of alphanumeric color information are generated externally for the arrangement of the present invention and are coupled to the output as signals "Color A Select"–"Color N Select". These signals are each coupled to gates 20A–20N which are used to activate the particular chrominance networks.

The master oscillator, of standard construction as shown in FIG. 2, provides a 3,579,545 hertz square wave signal. The circuit shown employs a pair of logic gates biased as inverting amplifiers 41 and 42 with an appropriate frequency crystal in the feedback path. The oscillator output is applied to a pair of inverters 43 and 44, the outputs of which provide 180° out of phase signals for use by the chrominance amplitude and phase shift networks. Each of the chrominance networks such as, for example, network A, includes a selector arrangement, shown as a switch Sa, a pair of "NAND" gates 30A and 31A, phase shift elements, resistive element 32A and reactive element 33A, output level adjust Ra, and current source resistor rA. The circuitry in each of the other channels is identical. Gate elements 30A and 31A are controlled by the output of gate 20A which is activated by the "Color A Select" signal.

When gates 30A and 31A are enabled, the signal at the output of nand gate 30A is applied to the resistive element 32A and to the input of nand gate 31A is applied to the reactive component 33A of the phase shift network. It will be understood that as the resistive and reactive components are thus supplied with equal amplitude but electrically (180°) out of phase signals, the phase of the signal at the common junction of the resistor and the reactive component can be varied by the ratio of the reactance of the reactive component (typically capacitive) to the resistance of the resistive component. By proper choice of the value of these components an almost complete 180° change in phase can be achieved. The inclusion of switch Sa enables virtually a complete 360° phase shift with respect to the basic oscillator signal. Switch Sa operates to select either the output of inverter 43 or 44 which provides signals 180° out of phase to the chrominance phase shift network.

At the common node of resistive element 32A and reactive component 33A, the phase of the signal is thus adjustable and applied to variable resistor Ra which adjusts the level of the chrominance signal for that channel. $R_A$ is then connected via rA to a filter and summing network comprising a resonant circuit, L1, C1. The wave shape of the signal applied to $R_A$ is square wave in shape. The resonant circuit is tuned to 3,579,545 which extracts the fundamental frequency component of the circuit which will appear as a sign wave across the tuned circuit. Similar "color select" signals are used to create other phased signals for the other channels. This phased signal is gated into the tuned circuit during the time that "Color A Select" is applied.

The chrominance information of the displayed color is thus determined by the ratio of R to X (giving the phase angle with respect to the "color burst" phase, and the setting of $R_A$ the chroma amplitude).

In addition to gating the individual chrominance networks, the outputs of gating elements 20A through 20N are applied, via inverting elements 21A through 21N to variable resistors Ra–Rn. These variable resistors are adjustable and have a setting which determines the video luminance level as will be explained further below.

The color video information is required to be gated with various synchronization information as is customary in TV broadcasting. In this regard, a standard synchronizing pulse generator (not shown) is used to create the required synchronizing pulses. The "burst flag" pulse which is used to gate a portion of the color subcarrier on the output wave form for the purpose of synchronizing the color circuits of receiving sets is applied to nand gate 35, which when enabled, causes a current to flow in resistor RBF. This signal will be a square wave as applied to RBF but will have its fundamental extracted by tuned circuit LC. Thus, an additive sine wave will appear across LC when the burst flag signal is applied and, if the circuit Q of LC is properly chosen, will stop when the burst flag ends. Resistor RBF can be made variable if desired so that the amplitude of the resultant sinusidal signal across the tuned circuit will be adjustable.

Other synchronizing and command signals are also applied to the gates 20A–20N. In particular, a composite blanking signal and a video overide signal "video A-Video N", are also applied to these gates. The composite blanking signal is used to turn off all picture information, e.g., chroma and luminance, when the synchronizing pulses are being presented. This insures that picture information does not affect picture synchronization on the receiving television system. Further, when the white character video is being displayed with properly defined gate signals, the resultant signal at the tuned circuit LC will be turned off to prevent color from appearing in the desired white character. The outputs of the gating luminance channels are applied through resistors Ra–Rn to a single summing point at summing resistor, Re. To this summing point is also applied the output of tuned circuit LC if desired, through buffer amplifier 34 and resistor Rchr, which may be made adjustable. Thus, it is seen that the signal applied to the variable resistors in the gating and luminance channels, e.g. to Ra, is a combination of Color A Select, Video A (inverted) and Composite Blanking. When the signal is not to be blanked and Video A is not present and Color A Select is present, a logical 1 will appear at each input to the appropriate gate, 20A–20N, and current will flow through Ra and be applied to the summing resistor Re. This current will determine the DC voltage developed across Re and hence the DC luminance level corresponding to the AC color component appearing at the input to resistor Rchr.

In addition to the color signals containing luminance and chrominance information which appears at Re, the composite sync signal and the combined digital video signals are also supplied to Re via variable resistors Res and Rev so that the voltage across Re is the composite video output signal. The composite sync signal, which is derived by standard means from a synchronizing signal generator, will enable the receiving television system to present a stable picture. The composite sync signal is combined with the color signals derived as above to create a standard television signal using the NTSC format and conforming to EIA standard RS-170. This signal is then applied to amplifier 22 for final buffering before being coupled to an external modulator, monitor or other appropriate devices.

In a practical embodiment of the invention, the primary frequency is 14,318,181 hertz and is divided by 4 to arrive at the 3,579,545 hertz master oscillator 10 output signal. The 14,318,181 hertz signal is required for the sync generator and to keep the sync signal compatable with EIA Standard RS-170 in standard existing systems. Accordingly, it would be possible to derive the 3,579,545 from and utilize the invention with existing systems as an add-on colorizer.

It should be understood that a particularly advantageous and simple arrangement has been described above, which enables the development of complete color video information adapted for including preselectable alphanumeric information using digital circuit techniques.

It should be pointed out that the present invention may be used in an additional application as a standard color bar test generator by applying appropriate gating signals to create bar patterns. In such an application, the arrangement set forth in FIGS. 1 and 2 are applicable with the exception that there is no "combined video" or alphanumeric character information to create the "white" video.

While the foregoing specification and drawings represent the preferred embodiment of the present invention, it will be obvious to those skilled in the art that various changes and modifications may be made therein without departing from the true spirit and scope of the present invention.

What is claimed is:

1. Color video signal generating apparatus for providing video signals for TV transmission purposes, comprising:

means for providing a master square wave signal of at least 3,579,535 hertz to at most 3,579,555 hertz;

means responsive to said master signal for providing an intermediate signal being selectable between 0 or 180° phase;

means for providing a plurality of digital command signals;

a plurality of means, responsive to said master square wave signal, each for providing a chrominance signal having a predetermined amplitude and phase associated with a different predetermined color and including a resistive means responsive to said intermediate signal, an inverting logic element responsive to said intermediate signals, and a reactive impedance means responsive to the output of said inverting logic means and whose output is combined with the output of said resistive means;

a plurality of digital gating means, each corresponding to a different one of said chrominance signal means and responsive to said digital command signals, for selectively activating predetermined ones of said chrominance signal means, and each including means for providing a luminance signal having a preselected amplitude associated with a different predetermined color;

means for adjusting the amplitude of the combined output of said resistive means and reactive impedance means to produce for each chrominance signal means a chrominance channel signal associated with a particular color;

means for combining the chrominance channel signals and for filtering said combined signal including an LC circuit tuned to 3,579,545 hertz for extracting the fundamental frequency of said combined chrominance channel signals; and gating means responsive to a composite blanking signal, said master signal and a burst flag signal for providing a gated 3,579,545 hertz for combining with said combined chrominance channel signal.

2. The apparatus of claim 1, wherein the luminance signal output of each channel of said gating means for said chrominance means is combined at a summing node; and wherein the combined chrominance signal, a combined video signal, and a composite sync are also summed at said summing node to develop a composite video output signal.

* * * * *